United States Patent
Fujii et al.

(10) Patent No.: US 12,334,237 B2
(45) Date of Patent: Jun. 17, 2025

(54) NON-ORIENTED ELECTRICAL STEEL SHEET AND METHOD FOR PRODUCING SAME

(71) Applicant: NIPPON STEEL CORPORATION, Tokyo (JP)

(72) Inventors: Hiroyasu Fujii, Tokyo (JP); Jun Maki, Tokyo (JP); Kazutoshi Takeda, Tokyo (JP); Akira Akagi, Tokyo (JP); Hiroyuki Mimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 253 days.

(21) Appl. No.: 17/778,178

(22) PCT Filed: Nov. 20, 2020

(86) PCT No.: PCT/JP2020/043479
§ 371 (c)(1),
(2) Date: May 19, 2022

(87) PCT Pub. No.: WO2021/100867
PCT Pub. Date: May 27, 2021

(65) Prior Publication Data
US 2023/0033301 A1  Feb. 2, 2023

(30) Foreign Application Priority Data
Nov. 21, 2019  (JP) .................. 2019-210860

(51) Int. Cl.
| | | |
|---|---|---|
| *H01F 1/147* | (2006.01) | |
| *B05D 3/02* | (2006.01) | |
| *B05D 7/14* | (2006.01) | |
| *C08K 3/32* | (2006.01) | |
| *H01F 41/02* | (2006.01) | |

(52) U.S. Cl.
CPC .......... *H01F 1/147* (2013.01); *B05D 3/0254* (2013.01); *B05D 7/14* (2013.01); *C08K 3/32* (2013.01); *H01F 41/02* (2013.01); *C08K 2003/327* (2013.01); *C08K 2003/328* (2013.01)

(58) Field of Classification Search
None
See application file for complete search history.

(56) References Cited

U.S. PATENT DOCUMENTS

| | | | |
|---|---|---|---|
| 5,945,212 A | 8/1999 | Tanaka et al. | |
| 7,976,902 B2 | 7/2011 | Han et al. | |
| 2002/0160180 A1* | 10/2002 | Yamamoto | C09D 5/106 |
| | | | 428/328 |
| 2009/0324837 A1* | 12/2009 | Han | C21D 8/1283 |
| | | | 427/386 |
| 2011/0039120 A1 | 2/2011 | Fujii et al. | |
| 2013/0115444 A1* | 5/2013 | Sashi | C22C 38/00 |
| | | | 428/331 |
| 2016/0111182 A1* | 4/2016 | Sashi | H01B 1/24 |
| | | | 428/340 |
| 2017/0335464 A1 | 11/2017 | Yamazaki et al. | |
| 2017/0341107 A1* | 11/2017 | Takahashi | B05D 3/0254 |
| 2017/0342568 A1 | 11/2017 | Yamazaki et al. | |
| 2017/0342569 A1 | 11/2017 | Takahashi et al. | |
| 2018/0033529 A1 | 2/2018 | Takeda et al. | |
| 2018/0155840 A1* | 6/2018 | Yamazaki | C21D 9/46 |
| 2019/0017137 A1* | 1/2019 | Bae | C22C 38/60 |
| 2019/0271087 A1 | 9/2019 | Takeda et al. | |
| 2020/0087549 A1* | 3/2020 | Kim | C09J 183/04 |

FOREIGN PATENT DOCUMENTS

| | | | |
|---|---|---|---|
| BR | PI0914161 A2 | 10/2015 | |
| JP | 60-262981 A | 12/1985 | |
| JP | 7-41913 A | 2/1995 | |
| JP | 7-166365 A | 6/1995 | |
| JP | 8-269571 A | 10/1996 | |
| JP | 11-80971 A | 3/1999 | |
| JP | 11-131250 A | 5/1999 | |
| JP | 2000160355 A * | 6/2000 | ............. C23C 22/83 |
| JP | 2000-204477 A | 7/2000 | |
| JP | 2001-129455 A | 5/2001 | |
| JP | 2002-47576 A | 2/2002 | |
| JP | 2002-69657 A | 3/2002 | |
| JP | 2005-314725 A | 11/2005 | |
| JP | 2008-303411 A | 12/2008 | |
| JP | 2009-155707 A | 7/2009 | |

(Continued)

OTHER PUBLICATIONS

Matsuzaki—JP 2000-160355A—Euro D2—MT—organic coated steel sheet—2000 (Year: 2000).*
Ge Huill. Study on Preparation and Property of Chromium-free Non-oriented Silicon Steel Insulating Coating [D]: [Master's thesis]. Beijing: Iron and Steel Research Institute, 2012: 14-17.†

(Continued)

*Primary Examiner* — John Vincent Lawler
(74) *Attorney, Agent, or Firm* — Birch, Stewart, Kolasch & Birch, LLP

(57) ABSTRACT

A non-oriented electrical steel sheet according to one embodiment of the present invention includes a base metal steel sheet, and a composite coating film composed of a Zn-containing phosphate and an organic resin, the composite coating film being formed on a surface of the base metal steel sheet, wherein: a content of Zn in the composite coating film is 10 mg/m² or more per side; and the product of an amount of oxygen in the base metal steel sheet and a sheet thickness of the base metal steel sheet is 50 ppm·mm or less.

9 Claims, No Drawings

(56) References Cited

FOREIGN PATENT DOCUMENTS

| | | |
|---|---|---|
| JP | 2009-545674 A | 12/2009 |
| JP | 2010-7140 A | 1/2010 |
| JP | 2010-261063 A | 11/2010 |
| JP | 2016-125141 A | 7/2016 |
| JP | 2016-125142 A | 7/2016 |
| JP | 2016-138333 A | 8/2016 |
| KR | 10-2017-0075592 A | 7/2017 |
| TW | 201323657 A1 | 6/2013 |
| WO | WO 2016/104404 A1 | 6/2016 |
| WO | WO 2016/104405 A1 | 6/2016 |
| WO | WO 2016/104407 A1 | 6/2016 |
| WO | WO 2016/104512 A1 | 6/2016 |
| WO | WO 2016/136515 A1 | 9/2016 |
| WO | WO 2016/194520 A1 | 12/2016 |
| WO | WO 2018/079845 | 5/2018 |

OTHER PUBLICATIONS

Xu Yan-bo. A Method for Calculating Strip Suspension Curve by Catenary [J]. Steel Rolling, 2013, 30(2):18-20.†

\* cited by examiner
† cited by third party

NON-ORIENTED ELECTRICAL STEEL SHEET AND METHOD FOR PRODUCING SAME

TECHNICAL FIELD

The present invention relates to a non-oriented electrical steel sheet, and a method for producing the same.

BACKGROUND ART

Non-oriented electrical steel sheets are used in the form of a so-called "laminate" that is formed by laminating a large number of steel sheets, as iron core material for motors. When non-oriented electrical steel sheets are used as an iron core for a motor, if a current referred to as an "eddy current" is induced in the normal direction of the surface of the laminated steel sheets, the efficiency of the motor decreases. Therefore, in order to prevent the generation of an eddy current, an insulating coating film is generally formed on the surface of the non-oriented electrical steel sheets.

In addition to preventing the generation of eddy currents, the insulating coating film also has a function of protecting the non-oriented electrical steel sheet itself which is constituted by elements composed mainly of iron from rusting, that is, against corrosion. Therefore, heretofore it has been common to form a chromate-based coating film having a strong corrosion-preventing action on the surface of non-oriented electrical steel sheets.

However, in recent years, with the increase in environmental consciousness, a large number of insulating coating films that do not use chromate compounds have been proposed. Among these proposed insulating coating films, a technique has been proposed in which "Zn" is adopted as one of the metal components in the coating solution serving as the material of the insulating coating film.

For example, Patent Document 1 discloses that a coating film agent containing one or more of Al phosphate, Ca phosphate, and Zn phosphate is used as an inorganic substance. Patent Document 2 discloses that an $Al_2O_3/H_3PO_4$ molar ratio, a $CaO/H_3PO_4$ molar ratio and a $ZnO/H_3PO_4$ molar ratio are defined with respect to Al phosphate, Ca phosphate and Zn phosphate, respectively, which are used as inorganic compounds in a coating. Patent Document 3 discloses the use of mono-aluminum phosphate and organic salts of Al, Mg, Ca and Zn. Patent Documents 4 to 6 disclose the use of a metal phosphate containing a Zn component.

The techniques mentioned above relate to inorganic components among the constituents of the coating film. On the other hand, as a technique that focuses on organic components among the constituents of a coating film, the use of a chelate-forming compound such as a phosphonic acid-based compound as a coating film constituent has also been proposed.

For example, Patent Document 7 discloses a technique in which a phosphonic acid-based or carboxylic acid-based chelate-forming compound is added to a coating solution. Patent Document 8 discloses a technique in which a phosphonic acid-based or carboxylic acid-based chelate-forming compound is used as a yellowing inhibitor. Patent Document 9 discloses a technique that uses hexafluorotitanic acid or hexafluorozirconic acid in addition to a phosphonic acid-based or carboxylic acid-based chelate-forming compound. Patent Document 10 discloses a technique in which a phosphonic acid-based or carboxylic acid-based chelate-forming compound is added to a coating solution. Patent Document 11 discloses a technique that uses a titanium chelate or the like. Patent Document 12 discloses a technique that uses a phosphonic acid-based or carboxylic acid-based chelate compound prior to coating after Ni-plating. Patent Document 13 discloses a technique in which a polyamine is added in addition to a phosphonic acid-based or carboxylic acid-based chelate-forming compound to a coating solution.

Furthermore, recently the following proposals have been made which further define the coating film structure on the premise that a phosphonic acid-based compound is used as a constituent of a coating solution for forming a coating film.

For example, Patent Document 14 discloses that the Fe area fraction in a cross section of a coating film determined using a transmission electron microscope or the like is defined. Patent Document 15 discloses that the relation between the ratio of P and the ratio of Fe bonded to 0 in a coating film which are determined by X-ray photoelectron spectroscopy is defined. Patent Document 16 discloses that the ratio of Fe/P in a coating film is defined. Patent Document 17 discloses that the integrated intensity ratio of P in nuclear magnetic resonance spectroscopy is defined. Patent Document 18 discloses that containing a carboxylic acid in a coating film is defined. Patent Document 19 discloses that the amount of phosphoric acid in a coating film is defined for each type. Patent Document 20 discloses that the ratio of $Fe^{3+}$ to the total amount of Fe in a coating film is defined. Patent Document 21 discloses that a concentrated amount of a divalent metal in a coating film is defined.

If an insulating coating film is formed on a non-oriented electrical steel sheet by applying the aforementioned technique using "Zn", a certain degree of corrosion resistance can be secured on surfaces on which the coating film is formed. However, in recent years, cases in which non-oriented electrical steel sheets are subjected to working in high-temperature and high-humidity environments as well as environments in which salt which is blown from the ocean adheres to the steel sheets are increasing, typically in Southeast Asian countries. In such harsh steel sheet processing environments of high temperatures and high humidity as well as salt adhesion, not only a surface on which an insulating coating film is formed but also a "steel sheet cut edge", on which no insulating coating film is formed, has been required to have high corrosion resistance.

In a process for producing various kinds of motors from electrical steel sheets, each electrical steel sheet is first formed into a predetermined shape. The most typical forming method is a method in which a die is used to punch an electrical steel sheet. On a cut edge of an electrical steel sheet, its base metal steel sheet is exposed, and therefore an anticorrosion effect by an insulating coating film cannot be obtained.

In this punching step, "punching oil" is used for reducing the wearing away of the die. The punching oil also adheres to a cut edge of a punched steel sheet to exert corrosion resistance to some extent. However, in consideration of an influence in steps after punching, frequent use of so-called "quick-drying oil" has recently been seen. After punching, the quick-drying oil evaporates and volatilize from a steel sheet cut edge to disappear in a very short time. It is difficult for such quick-drying oil to exhibit corrosion resistance.

Further, for some kind or the like of a motor, a cut edge of an electrical steel sheet may be stored as it is for a significantly long time after punching until the electrical steel sheet is conveyed to the next step. In the storage, corrosion may occur on the cut edge.

As above, not only securing corrosion resistance of a surface on which a coating film is formed but also improvement of corrosion resistance of a steel sheet cut edge is desired.

For the improvement of corrosion resistance of a steel sheet cut edge, Patent Document 22 proposes a method in which a carboxylic acid-based compound having a carbon number of 2 to 50 is added to a coating solution for forming an insulating coating film.

LIST OF PRIOR ART DOCUMENTS

Patent Documents

Patent Document 1: JP07-041913A
Patent Document 2: JP07-166365A
Patent Document 3: JP11-131250A
Patent Document 4: JP11-080971A
Patent Document 5: JP2001-129455A
Patent Document 6: JP2002-069657A
Patent Document 7: JP2002-47576A
Patent Document 8: JP2005-314725A
Patent Document 9: JP2008-303411A
Patent Document 10: JP2009-155707A
Patent Document 11: JP2009-545674A
Patent Document 12: JP2010-7140A
Patent Document 13: JP2010-261063A
Patent Document 14: WO 2016/104404
Patent Document 15: WO 2016/104405
Patent Document 16: WO 2016/104407
Patent Document 17: WO 2016/104512
Patent Document 18: JP2016-125141A
Patent Document 19: JP2016-125142A
Patent Document 20: JP2016-138333A
Patent Document 21: WO 2016/194520
Patent Document 22: WO 2016/136515

SUMMARY OF INVENTION

Technical Problem

Further, if an insulating coating film is formed on a non-oriented electrical steel sheet by applying the above-mentioned technique using the carboxylic acid-based compound having a carbon number of 2 to 50, a certain degree of corrosion resistance can also be secured on a steel sheet cut edge. However, after making studies, the present inventors consequently found that it is difficult in some cases to improve the corrosion resistance of a steel sheet cut edge even when a chelate compound such as a carboxylic acid-based compound is used.

Moreover, when a chelate compound is used as a component of a coating solution for forming a coating film, there is also the problem that this leads to an increase in the cost. The price competition with respect to non-oriented electrical steel sheets is intense, and the cost that can be spent on the coating solution for forming an insulating coating film is extremely limited. Therefore, inevitably there has been a desire for the cost of the raw material used for formation of the coating film to be low.

Against such problems, the present inventors tackled the development of a non-oriented electrical steel sheet that can stably exhibit the excellent corrosion resistance of Zn to a "steel sheet cut edge" as well without using an expensive carboxylic acid-based compound or the like, as well as a method for producing the non-oriented electrical steel sheet.

An object of the present invention is to solve the problems mentioned above, and to provide a non-oriented electrical steel sheet which is excellent in corrosion resistance of a steel sheet cut edge in a high-temperature and high-humidity environments as well as environments in which salt adhesion occurs even without using a chromate compound, which is a kind of environmentally hazardous substances, and without using an expensive organic compound such as a carboxylic acid-based compound, as well as a method for producing the non-oriented electrical steel sheet.

Solution to Problem

The present invention has been made to solve the problems described above, and the gist of the present invention is a non-oriented electrical steel sheet and a method for producing the non-oriented electrical steel sheet which are described hereunder.

(1) A non-oriented electrical steel sheet according to one embodiment of the present invention includes a base metal steel sheet, and a composite coating film composed of a Zn-containing phosphate and an organic resin, the composite coating film being formed on a surface of the base metal steel sheet, wherein: a content of Zn in the composite coating film is 10 mg/m$^2$ or more per side; and the product of an amount of oxygen in the base metal steel sheet and a sheet thickness of the base metal steel sheet is 50 ppm·mm or less.

(2) In the non-oriented electrical steel sheet according to (1) above, the composite coating film may further contain one or more elements selected from the group consisting of Al, Mg and Ca.

(3) In the non-oriented electrical steel sheet according to (1) or (2) above, the organic resin may include one or more resins selected from the group consisting of an acrylic resin, a styrene resin, an acrylic-styrene resin, an epoxy resin, a polyester resin, a phenol resin and a urethane resin.

(4) A method for producing a non-oriented electrical steel sheet according to another embodiment of the present invention including: a step of applying a coating solution to a surface of a base metal steel sheet, the coating solution containing a Zn-containing phosphate and an organic resin, and a step of forming a composite coating film in which a content of Zn is 10 mg/m$^2$ or more per side by baking the coating solution in an atmosphere in which an oxygen concentration is 30% or less under conditions of a peak metal temperature being within the range of 250 to 450° C. and a tensile strength applied to the base metal steel sheet being 15 to 60 N/mm$^2$.

(5) In the method for producing a non-oriented electrical steel sheet according to (4) above, the coating solution may further contain one or more elements selected from the group consisting of Al, Mg and Ca.

(6) In the method for producing a non-oriented electrical steel sheet according to (4) or (5) above, the organic resin may include one or more resins selected from the group consisting of an acrylic resin, a styrene resin, an acrylic-styrene resin, an epoxy resin, a polyester resin, a phenol resin and a urethane resin.

Advantageous Effects of Invention

According to the present invention, a non-oriented electrical steel sheet that can exhibit the excellent corrosion resistance of Zn on a steel sheet cut edge as well even without using environmentally hazardous substances such as a chromate compound, and an expensive organic compound typified by a carboxylic acid-based compound as the material of a coating film.

DESCRIPTION OF EMBODIMENT

The present inventors conducted intensive studies with respect to a method for improving the corrosion resistance of a steel sheet cut edge and consequently obtained the following findings.

The present inventors first conducted studies regarding a state of a "steel sheet cut edge" after a non-oriented electrical steel sheet including a coating film on its surface was cut with a shearing machine or punched with a die.

When the non-oriented electrical steel sheet is cut with a shearing machine or punched with a die, the coating film and the like formed on the surface of the steel sheet may adhere to the steel sheet cut edge. This is called the "reattaching effect". Paying attention to the relation between the "reattaching effect" and the corrosion resistance of the steel sheet cut edge, the present inventors conducted further studies.

When a steel sheet cut edge is exposed to a saltwater corrosive environment, moisture and salt content come into contact with the cut edge. It is presumed that as a result of the moisture coming in contact with the cut edge, components of the coating film and the like adhering to the cut edge dissolve, and the components that were dissolved form some kind of corrosion product.

It is considered that the corrosion resistance of a steel sheet is determined by the presence and the quality of such a corrosion product. In other words, when a corrosion product that suppresses the permeation of moisture and salt content is formed on a steel sheet cut edge, moisture and salt content are blocked from coming in contact with and penetrating into the steel sheet itself. Therefore, the corrosion of the steel sheet itself is suppressed, and as a result, the occurrence of rust is suppressed in the salt spray test.

As a result of studies made from such a viewpoint, the present inventors found that, in a case where a predetermined amount or more of Zn is contained in a coating film, when the coating film comes in contact with moisture and salt content, Zn is dissolved from the coating film adhering to a cut edge, forming a corrosion product excellent in corrosion resistance, so that the occurrence of red rust and the like can be suppressed on the cut edge.

On the other hand, if the "reattaching effect" described above is not obtained adequately, the formation of the corrosion product becomes insufficient. As described above, for the purpose of improving the adhesion between a coating film and a base metal steel sheet, a chelate compound can be contained in the coating film. However, it was found that too high adhesion makes the coating film difficult to come off, and it is therefore difficult to obtain the "reattaching effect".

Further, even when the "reattaching effect" is obtained, when a corrosion product for which an action of suppressing the permeation of moisture and salt content is low is formed on a steel sheet cut edge, moisture and salt content come in contact with and penetrate into the steel sheet itself in succession. Therefore, the corrosion of the steel sheet itself propagates, and as a result, base metal is dissolved in the salt spray test, resulting in a marked amount of rust occurrence.

As a result of studies made by the present inventors, it was found that when an oxidized layer is formed on a surface of a base metal steel sheet, the corrosion resistance of a cut edge deteriorates. Based on this reason, it is presumed that in a case where an oxidized layer is present on a surface of a base metal steel sheet, when the base metal steel sheet is cut by a shearing machine or punched by a die, the oxidized layer comes off to adhere a cut edge, and in the salt spray test, the oxidized layer forms a corrosion product into which water and salt content are likely to penetrate and that is poor in corrosion resistance, when the base metal steel sheet is put under a wet environment that includes water and salt.

Further, as a result of studies made regarding a method for suppressing the formation of an oxidized layer on a surface of a base metal steel sheet, the present inventors found that it is important to control a condition for baking a coating solution for forming a coating film applied to the base metal steel sheet. Specifically, it is important to bring a tension applied to a steel sheet in a baking furnace within a predetermined range and to decrease an oxygen concentration in the furnace.

The present invention has been made based on the above findings. The respective requirements of the present invention are described hereunder.

1. Non-Oriented Electrical Steel Sheet

A non-oriented electrical steel sheet according to the present embodiment includes a base metal steel sheet, and an insulating coating film that is formed on a surface of the base metal steel sheet. In general, insulating coating films of non-oriented electrical steel sheets are roughly classified into the following three kinds: purely organic coating films (entire coating film is composed of organic substances); inorganic coating films (entire coating film is composed of inorganic substances); and composite coating films (coating film is composed of a combination of organic substances and inorganic substances; this kind of coating film is also called a "semi-organic coating film"). The insulating coating film of the non-oriented electrical steel sheet according to the present embodiment is a composite coating film.

Further, phosphate, colloidal silica, alumina sol, zirconia sol and the like have been proposed as inorganic substances in the composite coating films. In the present invention, only phosphate is contained as an inorganic substance, and an inorganic substance other than phosphate, such as colloidal silica, alumina sol, or zirconia sol is not contained. Since the present invention is based on the technical idea that, as described above, corrosion resistance is improved by dissolving a Zn component that adheres to a cut edge, a Zn-containing phosphate is essential. In other words, in the present invention, the composite coating film contains a Zn-containing phosphate and an organic resin.

2. Composite Coating Film

In the non-oriented electrical steel sheet according to the present embodiment, a content of Zn in the composite coating film is 10 mg/m$^2$ or more per side. Here, the content of Zn per side means the average value of contents of Zn (mg/m$^2$) in the composite coating film per unit area on both a front surface and a back surface included in the base metal steel sheet.

If the content of Zn in the composite coating film is less than 10 mg/m$^2$, it is difficult for a corrosion product containing Zn, which is good in corrosion resistance, to be formed from the coating film reattaching onto the steel sheet cut edge. As a result, the corrosion resistance of the steel sheet cut edge becomes poor, increasing an amount of red rust occurrence. On the other hand, by making the content of Zn in the composite coating film 10 mg/m$^2$ or more, an adequate amount of Zn is dissolved from the coating film reattaching onto the steel sheet cut edge. This causes the corrosion product containing Zn, which is good in corrosion resistance, to be formed, which makes the corrosion resistance of the steel sheet cut edge excellent, decreasing an amount of red rust occurrence.

The content of Zn in the composite coating film is preferably 20 mg/m² or more per side, and more preferably is 30 mg/m² or more per side.

In the present invention, the content of Zn in the composite coating film is measured by the following method. First, a non-oriented electrical steel sheet containing the composite coating film is immersed in a methanol solution containing 5% by mass of bromine. Next, the non-oriented electrical steel sheet immersed in the solution is irradiated with an ultrasonic wave to dissolve the base metal steel sheet, and composite coating film components are filtered as residues.

The resultant residues are completely dissolved into the aqueous solution by an acid-dissolution alkaline-resolution method. Next, the aqueous solution is subjected to analysis by inductively coupled plasma (ICP) emission spectral analysis, by which an amount of Zn is determined. Finally, the determined amount of Zn is divided by a sample area (total area of front and back surfaces of the base metal steel sheet) of the non-oriented electrical steel sheet to be converted into an amount per unit area. For the ICP analysis of the filtered and collected composite coating film components, JIS K 0116:2014 "General rules for atomic emission spectrometry" can be invoked.

Further, in the non-oriented electrical steel sheet according to the present embodiment, the product of an amount of oxygen in the base metal steel sheet and a sheet thickness of the base metal steel sheet is 50 ppm·mm or less. Here, the amount of oxygen in the base metal steel sheet is a value obtained by analyzing an amount of oxygen using the steel sheet from which the composite coating film of the non-oriented electrical steel sheet is removed by a predetermined method as an analysis object, and its unit is ppm. Further, the sheet thickness of the base metal steel sheet is a sheet thickness of the steel sheet from which the composite coating film is removed from the non-oriented electrical steel sheet, and its unit is mm.

As described above, the present inventors found that when an oxidized layer is formed on a surface of a base metal steel sheet, the corrosion resistance of a cut edge deteriorates. In particular, it is found that a good correlation is recognized between salt spray corrosion resistance and the product of a base-metal-steel-sheet oxygen amount and the sheet thickness.

Before baking, a surface of a base metal steel sheet on which a coating solution for forming a composite coating film is applied is not oxidized. This is because the base metal steel sheet before the treatment solution is applied thereto has been annealed in an atmosphere having low oxidative properties. Therefore, oxygen measured as the amount of oxygen of the base metal steel sheet is oxygen produced by oxidizing the base metal steel sheet when the coating solution is baked.

Here, it should be noted that the amount of oxygen of the base metal steel sheet is the mass proportion of oxygen in a sample to the total mass of the base metal steel sheet (that is, the average content of oxygen in the sample). The surface of the base metal steel sheet of the non-oriented electrical steel sheet contains oxygen derived from surface oxidation in baking, but the inside of the base metal steel sheet contains little oxygen. Therefore, in a case where amounts of oxygen of a thin base metal steel sheet and a thick base metal steel sheet that have been subjected to baking under the same condition (that is, the degrees of oxidation of their surfaces are almost the same) are measured by the aforementioned method, the amount of oxygen of the base metal steel sheet having the small sheet thickness is calculated to be larger than the amount of oxygen of the base metal steel sheet having the large sheet thickness.

Hence, the present inventors decided to use a value obtained by multiplying an amount of oxygen of a base metal steel sheet by a sheet thickness (mm) of the base metal steel sheet as an index for evaluating the degree of oxidation of a surface of the base metal steel sheet. By multiplying the measured amount of oxygen by the sheet thickness, it is possible to correct an influence of the sheet thickness of the base metal steel sheet on the measured value of the amount of oxygen of the base metal steel sheet.

By making the product of the amount of oxygen of a base metal steel sheet and the sheet thickness of the base metal steel sheet 50 ppm·mm or less, it becomes possible to suppress the reattaching of an oxidized layer onto a cut edge, promoting the formation of a corrosion product containing Zn, which is good in corrosion resistance. The product of the amount of oxygen of a base metal steel sheet and the sheet thickness of the base metal steel sheet is preferably 40 ppm·mm or less, and more preferably is 30 ppm·mm or less.

In the present invention, the amount of oxygen in a base metal steel sheet is measured by the following method. First, a non-oriented electrical steel sheet is boiled in a sodium hydroxide aqueous solution having a concentration of 50% for 30 minutes, by which its composite coating film is removed from its base metal steel sheet. Next, the amount of oxygen in the resultant steel sheet is measured by JIS G 1239:2014 "Iron and steel—Determination of oxygen—Infrared absorption method after fusion under inert gas".

Note that, in the present invention, when the product of the amount of oxygen of a base metal steel sheet and the sheet thickness of the base metal steel sheet is calculated, the product is subjected to cash rounding, and the result is displayed in a form of a multiple of five, in consideration of a measurement precision of the amount of oxygen.

The composite coating film may contain, in addition to Zn, one or more elements selected from the group consisting of Al, Mg and Ca. These elements are desirably contained in a form of their phosphates as with Zn. Note that, when taking environmental loads into consideration, it is not preferable for the composite coating film to contain a chromate compound or a substance derived therefrom. The content of a chromate compound and a substance derived therefrom should be reduced as much as possible so as to meet environmental standards, and preferably the content is 0% by mass.

Further, examples of the organic resin include, but not limited to, one or more resins selected from the group consisting of an acrylic resin, a styrene resin, an acrylic-styrene resin, an epoxy resin, a polyester resin, a phenol resin and a urethane resin.

There are no particular limits on the other components, either. However, as described above, if the composite coating film contains a chelate compound such as a phosphonic acid-based compound and carboxylic acid-based compound, the adhesion between the coating film and the base metal steel sheet is improved, making the coating film difficult to come off, and it may be therefore difficult to obtain the "reattaching effect". Thus, the composite coating film according to the present invention is to contain no chelate compound.

3. Base Metal Steel Sheet

The base metal steel sheet of the non-oriented electrical steel sheet according to the present embodiment is not particularly limited. This is because improvement of corrosion resistance that is the task of the non-oriented electrical steel sheet according to the present embodiment is achieved by means of the aforementioned characteristics of the insulating coating film. The base metal steel sheet can be appropriately selected from among steel sheets that usually used as base metal steel sheets of non-oriented electrical steel sheets.

4. Production Method

The non-oriented electrical steel sheet according to the present embodiment can be produced by a production method that includes a step of applying a coating solution to a surface of the base metal steel sheet, and thereafter, a step of forming a composite coating film on the base metal steel sheet by baking the coating solution.

4-1. Coating Solution

The coating solution to be applied to the surface of the base metal steel sheet contains an aqueous phosphate solution and an aqueous dispersion of organic resin. Further, a Zn component is included in the metal components in the aqueous phosphate solution. It is necessary to formulate components of the coating solution such that the content of Zn is 10 mg/m$^2$ or more per side after the baking. In addition to Zn, the components may include, but not limited to, one or more elements selected from the group consisting of Al, Mg and Ca.

The kind of the organic resin is not particularly limited. Any kind of organic resin can be used as long as the resin does not form coarse agglomerates when mixed with an aqueous phosphate solution. Examples of a preferable organic resin include one or more resins selected from the group consisting of an acrylic resin, a styrene resin, an acrylic-styrene resin, an epoxy resin, a polyester resin, a phenol resin and a urethane resin.

The ratio between the aqueous phosphate solution and the aqueous dispersion of organic resin can be arbitrarily selected. A non-oriented electrical steel sheet on which an insulating coating film has been formed using a coating solution that does not contain an aqueous dispersion of organic resin tends to be poor in punchability. Therefore, it is better to include an aqueous dispersion of organic resin in the coating solution. The blending ratio of the aqueous phosphate solution and the aqueous dispersion of organic resin may be determined in consideration of the solid content concentration of each. As long as the blending ratio is controlled so that the aforementioned content of Zn is within a predetermined range, the insulating coating film will contain a sufficient amount of Zn for securing corrosion resistance of a cut edge irrespective of the blending ratio.

Note that, from the viewpoint of reduction of environmental loads, it is not preferable to contain a chromate compound in the coating solution.

4-2. Baking Conditions

Further, when the coating solution is baked, it is necessary to suppress the formation of an oxidized layer on the surface of a base metal steel sheet. Therefore, it is important for the present invention to control baking conditions.

The baking of the coating solution is typically performed in a continuous line. At this point, to suppress the formation of an oxidized layer, it is necessary to adjust a tension applied to the steel sheet within a preferable range, and specifically, the tensile strength applied to the base metal steel sheet is adjusted to 15 to 60 N/mm$^2$. The tensile strength described above is preferably 20 N/mm$^2$ or more and preferably 50 N/mm$^2$ or less.

Although the mechanism is not clear, it is presumed that if the tensile strength applied to the steel sheet is too low, the steel sheet may meander to come in contact with equipment and the like in a baking furnace, and additionally the coating solution is not applied evenly, resulting in a portion that is likely to be oxidized. On the other hand, it is considered that if the tensile strength is excessive, grain boundaries are widened to be likely to be oxidized.

Moreover, even when the tension applied to the base metal steel sheet is within the range described above, if the concentration of oxygen in a furnace atmosphere is too high, it is difficult to suppress the formation of the oxidized layer. For that reason, the concentration of oxygen in the atmosphere in the baking furnace is set to 30% or less. The concentration of oxygen is preferably 20% or less.

Further, if a peak metal temperature in the baking is too low, the baking becomes insufficient, and thus stickiness occurs. On the other hand, if the peak metal temperature is too high, it is difficult to suppress the formation of an oxidized layer, and the corrosion resistance of a cut edge deteriorates. For that reason, the peak metal temperature in the baking is set within the range of 250 to 450° C.

Hereunder, the present invention is described more specifically by way of examples, although the present invention is not limited to these examples.

EXAMPLES (Example 1) Tension in Baking

Non-oriented electrical steel sheets that had a sheet thickness of 0.5 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted to 20% with a mixture of Al phosphate and Zn phosphate, and 20 g of an aqueous dispersion of acrylic/styrene resin with a concentration of 40% was applied to these base metal steel sheets. Subsequently, a composite coating film was formed on the base metal steel sheets while various tensions were applied, by setting 20% as the concentrations of oxygen in the atmosphere and setting 340° C. as the peak metal temperature.

The amount of composite coating film was set so as to be 1.5 g/m$^2$ per side. Moreover, the composite coating film was provided on both surfaces of each base metal steel sheet, and the amount and the components of the composite coating film were set to be substantially the same. Subsequently, the content of Zn per side of the composite coating film was determined by "Dissolution in bromine/methanol dissolution—acid/alkali dissolution preparation—ICP spectrometry" described above. As a result, the contents of Zn of the composite coating films were all 10 mg/m$^2$ per side.

Further, the non-oriented electrical steel sheet with the composite coating film formed thereon is boiled in a sodium hydroxide aqueous solution having a concentration of 50% for 30 minutes, by which the amount of contained oxygen was measured by JIS G 1239:2014 "Iron and steel—Determination of oxygen—Infrared absorption method after fusion under inert gas". Subsequently, by multiplying the measured value by the sheet thickness, the product (ppm·mm) of the amount of oxygen of the base metal steel sheet and the sheet thickness of the base metal steel sheet was determined.

Next, the non-oriented electrical steel sheet with the composite coating film was cut with a shearing machine into 20 mm×50 mm size. Twenty cut non-oriented electrical steel sheets were stacked such that the total height of their cut edges was 10 mm. Next, evaluation of the corrosion resistance was performed by the salt spray test with respect to one 10 mm×50 mm stacked cut edge of this stacked body. The salt spray corrosion resistance test was performed in accordance with HS Z 2371. The NaCl concentration of the salt aqueous solution for the test was 5% by mass. The temperature in the vicinity of the test specimen retainer in the spray chamber was set to 35 C°. The judgment of the corrosion resistance was determined by adopting the red rust area ratio of the stacked cut edge of each non-oriented electrical steel sheet at the time point at which the spraying time reached 8 hours, and levels were classified as described hereunder. The determination A or B was taken as being good.

(Criteria for Corrosion Resistance Evaluation by Salt Spray Test)

When red rust area ratio is less than 10%: A

When red rust area ratio is 10% or more and less than 20%: B

When red rust area ratio is 20% or more and less than 30%: C

When red rust area ratio is 30% or more and less than 40%: D

When red rust area ratio is 40% or more: E

The results of the above are shown in Table 1.

[Table 1]

TABLE 1

| Test No. | Tensile strength (N/mm$^2$) | Product of an oxgen amount and a sheet thickness (ppm · mm) | Salt spray corrosion resistance Red rust area fraction (%) | Judgment | |
|---|---|---|---|---|---|
| 1-1 | 10 | 70 | 26 | C | Comparative example |
| 1-2 | 20 | 40 | 14 | B | Inventive example |
| 1-3 | 40 | 45 | 18 | B | Inventive example |
| 1-4 | 80 | 80 | 28 | C | Comparative example |

From Table 1, it is understood that, by setting the tensile strength applied to the steel sheet in the baking within the range of 15 to 60 N/mm$^2$, the formation of an oxidized layer was suppressed, and thus the salt spray corrosion resistance of the steel sheet cut edge was good.

(Example 2) Content of Zn and Concentration of Oxygen

Non-oriented electrical steel sheets that had a sheet thickness of 0.5 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted within the range of 0 to 100% with Al phosphate, Zn phosphate or a mixture of these, and 15 g of an aqueous dispersion of acrylic-styrene-based organic resin with a concentration of 40% was applied to these base metal steel sheets. Subsequently, a composite coating film was formed on the base metal steel sheets at various concentrations of oxygen in the atmosphere by setting 340° C. as the peak metal temperature.

In the baking, the tensile strength applied to the steel sheet was set to 22 N/mm$^2$. The amount of composite coating film was set so as to be 1 g/m$^2$ per side. Moreover, the composite coating film was provided on both surfaces of each base metal steel sheet, and the amount and the components of the composite coating film were set to be substantially the same. The various kinds of analysis and evaluation were performed according to the same criteria as in EXAMPLE 1. The results are shown in Tables 2 and 3.

TABLE 2

| Test No. | Zn content (mg/m$^2$) | Oxygen concentration (%) | Product of an oxgen amount and a sheet thickness (ppm · mm) | Salt spray corrosion resistance Red rust area fraction (%) | Judgment | |
|---|---|---|---|---|---|---|
| 2-1 | 0 | 50 | 180 | 80 | E | Comparative example |
| 2-2 | 0 | 40 | 100 | 50 | E | Comparative example |
| 2-3 | 0 | 30 | 50 | 38 | D | Comparative example |
| 2-4 | 0 | 20 | 45 | 35 | D | Comparative example |
| 2-5 | 0 | 10 | 30 | 34 | D | Comparative example |
| 2-6 | 0 | 5 | 20 | 32 | D | Comparative example |
| 2-7 | 0 | 1 | 10 | 30 | D | Comparative example |
| 2-8 | 10 | 50 | 170 | 29 | C | Comparative example |
| 2-9 | 10 | 40 | 100 | 28 | C | Comparative example |
| 2-10 | 10 | 30 | 50 | 15 | B | Inventive example |
| 2-11 | 10 | 20 | 40 | 14 | B | Inventive example |
| 2-12 | 10 | 10 | 35 | 14 | B | Inventive example |
| 2-13 | 10 | 5 | 20 | 13 | B | Inventive example |
| 2-14 | 10 | 1 | 10 | 12 | B | Inventive example |
| 2-15 | 20 | 50 | 165 | 27 | C | Comparative example |

TABLE 2-continued

| Test No. | Zn content (mg/m²) | Oxygen concentration (%) | Product of an oxgen amount and a sheet thickness (ppm · mm) | Salt spray corrosion resistance Red rust area fraction (%) | Judgment | |
|---|---|---|---|---|---|---|
| 2-16 | 20 | 40 | 105 | 26 | C | Comparative example |
| 2-17 | 20 | 30 | 50 | 14 | B | Inventive example |
| 2-18 | 20 | 20 | 45 | 13 | B | Inventive example |
| 2-19 | 20 | 10 | 30 | 13 | B | Inventive example |
| 2-20 | 20 | 5 | 25 | 12 | B | Inventive example |
| 2-21 | 20 | 1 | 10 | 11 | B | Inventive example |
| 2-22 | 30 | 50 | 160 | 28 | C | Comparative example |
| 2-23 | 30 | 40 | 105 | 29 | C | Comparative example |
| 2-24 | 30 | 30 | 50 | 8 | A | Inventive example |
| 2-25 | 30 | 20 | 45 | 9 | A | Inventive example |
| 2-26 | 30 | 10 | 35 | 9 | A | Inventive example |
| 2-27 | 30 | 5 | 20 | 7 | A | Inventive example |
| 2-28 | 30 | 1 | 10 | 8 | A | Inventive example |

TABLE 3

| Test No. | Zn content (mg/m²) | Oxygen concentration (%) | Product of an oxgen amount and a sheet thickness (ppm · mm) | Salt spray corrosion resistance Red rust area fraction (%) | Judgment | |
|---|---|---|---|---|---|---|
| 2-29 | 40 | 50 | 150 | 25 | C | Comparative example |
| 2-30 | 40 | 40 | 100 | 24 | C | Comparative example |
| 2-31 | 40 | 30 | 45 | 9 | A | Inventive example |
| 2-32 | 40 | 20 | 45 | 7 | A | Inventive example |
| 2-33 | 40 | 10 | 35 | 7 | A | Inventive example |
| 2-34 | 40 | 5 | 20 | 8 | A | Inventive example |
| 2-35 | 40 | 1 | 10 | 8 | A | Inventive example |
| 2-36 | 60 | 50 | 160 | 26 | C | Comparative example |
| 2-37 | 60 | 40 | 100 | 25 | C | Comparative example |
| 2-38 | 60 | 30 | 50 | 8 | A | Inventive example |
| 2-39 | 60 | 20 | 40 | 8 | A | Inventive example |
| 2-40 | 60 | 10 | 30 | 7 | A | Inventive example |
| 2-41 | 60 | 5 | 25 | 7 | A | Inventive example |
| 2-42 | 60 | 1 | 10 | 8 | A | Inventive example |
| 2-43 | 80 | 50 | 160 | 24 | C | Comparative example |
| 2-44 | 80 | 40 | 100 | 23 | C | Comparative example |
| 2-45 | 80 | 30 | 50 | 7 | A | Inventive example |
| 2-46 | 80 | 20 | 40 | 6 | A | Inventive example |
| 2-47 | 80 | 10 | 35 | 7 | A | Inventive example |
| 2-48 | 80 | 5 | 20 | 4 | A | Inventive example |
| 2-49 | 80 | 1 | 10 | 5 | A | Inventive example |
| 2-50 | 100 | 50 | 150 | 23 | C | Comparative example |
| 2-51 | 100 | 40 | 105 | 20 | C | Comparative example |
| 2-52 | 100 | 30 | 45 | 6 | A | Inventive example |
| 2-53 | 100 | 20 | 40 | 5 | A | Inventive example |
| 2-54 | 100 | 10 | 30 | 6 | A | Inventive example |
| 2-55 | 100 | 5 | 25 | 5 | A | Inventive example |
| 2-56 | 100 | 1 | 10 | 4 | A | Inventive example |

From Tables 2 and 3, it is understood that, by setting the content of Zn of the composite coating film to 10 mg/m² or more per side and setting the product of the amount of oxygen and the sheet thickness of the base metal steel sheet to 50 ppm·mm, the salt spray corrosion resistance of the steel sheet cut edge was good.

(Example 3) Zn/Mg Phosphate

Non-oriented electrical steel sheets that had a sheet thickness of 0.5 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted within the range of 0 to 100% with Mg phosphate, Zn phosphate or a mixture of these, and 10 g of an aqueous dispersion of acrylic-styrene-based organic resin with a concentration of 40% was applied to this base metal steel sheet. Subsequently, a composite coating film was formed on the base metal steel sheets, by setting 20% as the concentrations of oxygen in the atmosphere and setting 340° C. as the peak metal temperature.

In the baking, the tensile strength applied to the steel sheet was set to 22 N/mm². The amount of composite coating film was set so as to be 1 g/m² per side. Moreover, the composite coating film was provided on both surfaces of each base metal steel sheet, and the amount and the components of the composite coating film were set to be substantially the same. The various kinds of analysis and evaluation were performed according to the same criteria as in EXAMPLE 1. The results are shown in Table 4.

TABLE 4

| Test No. | Zn content (mg/m²) | Product of an oxgen amount and a sheet thickness (ppm · mm) | Salt spray corrosion resistance Red rust area fraction (%) | Judgment | |
|---|---|---|---|---|---|
| 3-1 | 0 | 40 | 30 | D | Comparative example |
| 3-2 | 10 | 45 | 10 | B | Inventive example |
| 3-3 | 20 | 40 | 10 | B | Inventive example |
| 3-4 | 30 | 45 | 5 | A | Inventive example |
| 3-5 | 40 | 30 | 5 | A | Inventive example |
| 3-6 | 60 | 40 | 5 | A | Inventive example |
| 3-7 | 80 | 35 | 5 | A | Inventive example |
| 3-8 | 100 | 40 | 5 | A | Inventive example |

From Table 4, it is understood that when the content of Zn of the composite coating film was 10 mg/m² or more per side, and the product of the amount of oxygen and the sheet thickness of the base metal steel sheet was 50 ppm·mm, the salt spray corrosion resistance of the steel sheet cut edge was good even when the metallic component of the phosphate was Zn/Mg based.

(Example 4) Zn/Ca Phosphate

Non-oriented electrical steel sheets that had a sheet thickness of 0.35 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted within the range of 0 to 100% with Ca phosphate, Zn phosphate or a mixture of these, and 20 g of an aqueous dispersion of acrylic-styrene-based organic resin with a concentration of 40% was applied to these base metal steel sheets. Subsequently, a composite coating film was formed on the base metal steel sheets, by setting 30% as the concentrations of oxygen in the atmosphere and setting 340° C. as the peak metal temperature.

In the baking, the tensile strength applied to the steel sheet was set to 22 N/mm². The amount of composite coating film was set so as to be 1 g/m² per side. Moreover, the composite coating film was provided on both surfaces of each base metal steel sheet, and the amount and the components of the composite coating film were set to be substantially the same. The various kinds of analysis and evaluation were performed according to the same criteria as in EXAMPLE 1. The results are shown in Table 5.

TABLE 5

| Test No. | Zn content (mg/m²) | Product of an oxgen amount and a sheet thickness (ppm · mm) | Salt spray corrosion resistance Red rust area fraction (%) | Judgment | |
|---|---|---|---|---|---|
| 4-1 | 0 | 50 | 35 | D | Comparative example |
| 4-2 | 10 | 45 | 15 | B | Inventive example |
| 4-3 | 20 | 50 | 15 | B | Inventive example |
| 4-4 | 30 | 45 | 5 | A | Inventive example |
| 4-5 | 40 | 50 | 5 | A | Inventive example |
| 4-6 | 60 | 40 | 5 | A | Inventive example |
| 4-7 | 80 | 45 | 5 | A | Inventive example |
| 4-8 | 100 | 50 | 5 | A | Inventive example |

From Table 5, it is understood that when the content of Zn of the composite coating film was 10 mg/m² or more per side, and the product of the amount of oxygen and the sheet thickness of the base metal steel sheet was 50 ppm·mm or less, the salt spray corrosion resistance of the steel sheet cut edge was good even when the metallic component of the phosphate was Zn/Ca based.

(Example 5) Organic Resin

Non-oriented electrical steel sheets that had a sheet thickness of 0.5 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted to 70% with a mixture of Al phosphate and Zn phosphate, and 15 g of aqueous dispersions of different kinds of organic resin with a concentration of 40% was applied to these base metal steel sheets. Subsequently, a composite coating film was formed on the base metal steel sheets, by setting 5% as the concentrations of oxygen in the atmosphere and setting 340° C. as the peak metal temperature.

In the baking, the tensile strength applied to the steel sheet was set to 22 N/mm². The amount of composite coating film was set so as to be 0.8 g/m² per side. Moreover, the composite coating film was provided on both surfaces of each base metal steel sheet, and the amount and the components of the composite coating film were set to be substantially the same. The various kinds of analysis and evaluation were performed according to the same criteria as in EXAMPLE 1. The results are shown in Table 6. Note that the contents of Zn of the composite coating films were all 15 mg/m² per side.

TABLE 6

| Test No. | Resin | Product of an oxgen amount and a sheet thickness (ppm·mm) | Salt spray corrosion resistance Red rust area fraction (%) | Judgment | |
|---|---|---|---|---|---|
| 5-1 | Acrylic resin | 20 | 5 | A | Inventive example |
| 5-2 | Styrene resin | 25 | 5 | A | Inventive example |
| 5-3 | Eposy resin | 20 | 5 | A | Inventive example |
| 5-4 | Polyester resin | 25 | 5 | A | Inventive example |
| 5-5 | Phenol resin | 20 | 5 | A | Inventive example |
| 5-6 | Urethane resin | 20 | 5 | A | Inventive example |

From Table 6, it is understood that when the content of Zn of the composite coating film was 10 mg/m² or more per side, and the base-metal-steel-sheet oxygen amount on a 1 mm sheet thickness basis was 50 ppm·mm or less, the salt spray corrosion resistance of the steel sheet cut edge was good even when any of these kinds of organic resin was used.

(Example 6) Baking Temperature

Non-oriented electrical steel sheets that had a sheet thickness of 0.5 mm, which had been annealed, but on which a composite coating film had not been formed (that is, base metal steel sheets) were prepared. Since the annealing was performed in an atmosphere having low oxidative properties, the surfaces of these base metal steel sheets were not oxidized. A mixed solution composed of 100 g of an aqueous phosphate solution having a solid content concentration of 50% in which the Zn molar ratio was adjusted to 20% with a mixture of Al phosphate and Zn phosphate, and 20 g of an aqueous dispersion of acrylic/styrene resin with a concentration of 40% was applied to these base metal steel sheets. Subsequently, a composite coating film was formed on the base metal steel sheets by setting 1% as the concentration of oxygen in the atmosphere with various peak metal temperatures.

In the baking, the tensile strength applied to the steel sheet was set to 22 N/mm². The amount of composite coating film was set so as to be 1.5 g/m² per side. Moreover, the composite coating film was provided on both surfaces of each base metal steel sheet, and the amount and the components of the composite coating film were set to be substantially the same. The various kinds of analysis and evaluation were performed according to the same criteria as in EXAMPLE 1. The results are shown in Table 7. Note that the contents of Zn of the composite coating films were all 10 mg/m² per side.

TABLE 7

| Test No. | Peak metal temperature (°C.) | Product of an oxgen amount and a sheet thickness (ppm·mm) | Salt spray corrosion resistance Red rust area fraction (%) | Judgment | |
|---|---|---|---|---|---|
| 6-1 | 200 | 20 | — | Un-evaluable | Comparative example |
| 6-2 | 250 | 25 | 10 | B | Inventive example |
| 6-3 | 300 | 20 | 5 | A | Inventive example |
| 6-4 | 350 | 35 | 5 | A | Inventive example |
| 6-5 | 400 | 35 | 5 | A | Inventive example |
| 6-6 | 450 | 40 | 10 | B | Inventive example |
| 6-7 | 510 | 100 | 35 | D | Comparative example |

From Table 7, it is understood that when the peak metal temperature was 250 to 450° C., the salt spray corrosion resistance of the steel sheet cut edge was good. A composite coating film fabricated under a condition of the peak metal temperature being 200° C. was insufficient in baking onto the base metal steel sheet, causing stickiness, and thus the corrosion resistance of its cut edge could not be evaluated. Under a condition of the peak metal temperature being 510° C., the rust area fraction was 35% due to the formation of an oxidized layer, and the corrosion resistance was poor.

INDUSTRIAL APPLICABILITY

According to the present invention, a non-oriented electrical steel sheet that can exhibit the excellent corrosion resistance of Zn on a steel sheet cut edge as well even without using environmentally hazardous substances such as a chromate compound, and an expensive organic compound typified by a carboxylic acid-based compound as the material of a coating film. Thus, the non-oriented electrical steel sheet according to the present invention can suppress the red rust occurrence on its steel sheet cut edge even when being exposed to a harsh environment in which airborne salt particles waft from the ocean.

The invention claimed is:
1. A non-oriented electrical steel sheet, comprising:
  a base metal steel sheet, and
  a composite coating film composed of a Zn-containing phosphate and an organic resin, the composite coating film being formed on a surface of the base metal steel sheet,
  wherein:
  a content of Zn in the composite coating film is 10 mg/m² or more per side, and
  a product of an amount of oxygen in the base metal steel sheet and a sheet thickness of the base metal steel sheet is 50 ppm·mm or less, and
  wherein a red rust area ratio of a stacked cut edge of the non-oriented electrical steel sheet at a time point at which a spraying time reached 8 hours is less than 20% when the non-oriented electrical steel sheet with the composite coating film is cut with a shearing machine into 20 mm×50 mm size, twenty cut non-oriented electrical steel sheets are stacked such that a total height of their cut edges is 10 mm, and evaluation of corrosion resistance is performed by a salt spray test in accordance with JIS Z 2371 with respect to one 10 mm×50 mm stacked cut edge of the stacked body wherein a NaCl concentration of a salt aqueous solution for the test is 5% by mass and a temperature in the vicinity of a test specimen retainer in a spray chamber is set to 35° C.

2. The non-oriented electrical steel sheet according to claim 1, wherein:
the composite coating film further contains one or more of Al, Mg and Ca.

3. The non-oriented electrical steel sheet according to claim 2, wherein:
the organic resin includes one or more of an acrylic resin, a styrene resin, an acrylic-styrene resin, an epoxy resin, a polyester resin, a phenol resin and a urethane resin.

4. The non-oriented electrical steel sheet according to claim 1, wherein:
the organic resin includes one or more of an acrylic resin, a styrene resin, an acrylic-styrene resin, an epoxy resin, a polyester resin, a phenol resin and a urethane resin.

5. A method for producing the non-oriented electrical steel sheet according to claim 1, the method comprising:
a step of applying a coating solution to a surface of a base metal steel sheet, the coating solution containing a Zn-containing phosphate and an organic resin, and
a step of forming a composite coating film in which a content of Zn is 10 mg/m² or more per side by baking the coating solution in an atmosphere in which an oxygen concentration is 30% or less under conditions of a peak metal temperature being within a range of 250 to 450° C. and a tensile strength applied to the base metal steel sheet being 15 to 60 N/mm².

6. The method for producing a non-oriented electrical steel sheet according to claim 5, wherein:
the coating solution further contains one or more of Al, Mg and Ca.

7. The method for producing a non-oriented electrical steel sheet according to claim 6, wherein:
the organic resin includes one or more of an acrylic resin, a styrene resin, an acrylic-styrene resin, an epoxy resin, a polyester resin, a phenol resin and a urethane resin.

8. The method for producing a non-oriented electrical steel sheet according to claim 5, wherein:
the organic resin includes one or more of an acrylic resin, a styrene resin, an acrylic-styrene resin, an epoxy resin, a polyester resin, a phenol resin and a urethane resin.

9. A non-oriented electrical steel sheet, comprising:
a base metal steel sheet, and
a composite coating film comprising a Zn-containing phosphate and an organic resin, the composite coating film being formed on a surface of the base metal steel sheet,
wherein:
a content of Zn in the composite coating film is 10 mg/m² or more per side, and
a product of an amount of oxygen in the base metal steel sheet and a sheet thickness of the base metal steel sheet is 50 ppm·mm or less, and
wherein a red rust area ratio of a stacked cut edge of the non-oriented electrical steel sheet at a time point at which a spraying time reached 8 hours is less than 20% when the non-oriented electrical steel sheet with the composite coating film is cut with a shearing machine into 20 mm×50 mm size, twenty cut non-oriented electrical steel sheets are stacked such that a total height of their cut edges is 10 mm, and evaluation of corrosion resistance is performed by a salt spray test in accordance with JIS Z 2371 with respect to one 10 mm×50 mm stacked cut edge of the stacked body wherein a NaCl concentration of a salt aqueous solution for the test is 5% by mass and a temperature in the vicinity of a test specimen retainer in a spray chamber is set to 35° C.

* * * * *